JAMES V. BRYSON.
Gleaner-Rake for Reaping Machines.
No. 118,430. Patented Aug. 29, 1871.

Witnesses
Jas L Ewing
Walter Allen

Inventor
James V. Bryson
By Knight Bros

UNITED STATES PATENT OFFICE.

JAMES V. BRYSON, OF GREENUPSBURG, KENTUCKY.

IMPROVEMENT IN GLEANER-RAKES FOR REAPING-MACHINES.

Specification forming part of Letters Patent No. 118,430, dated August 29, 1871.

*To all whom it may concern:*

Be it known that I, JAMES V. BRYSON, of Greenupsburg, in the county of Greenup, Kentucky, have invented an Improved Gleaner Attachment for Reapers, of which the following is a specification:

The function of the attachment is to gather up the grain left by the binders or wasted by the machine, so that the same may be saved. Being applied to the machine and adapted to be controlled by the driver, the attachment performs the work without adding to the expense of harvesting, and without increasing the labor to any considerable extent.

In our improved attachment a spring-tooth rake of the same length as the cutter-bar is arranged behind the frame, projecting laterally from the side of the frame opposite the cutter-bar. It thus serves to take away a portion of the side draft and is also adapted to glean successively the rounds last before cut and to leave the gathered grain where it may readily be taken up and bound with that from the dropper. A hinge in the rear of the head of the rake adapts the projecting part to fold, so as to yield to obstructions and also compact the machine for going from place to place. A wooden pin locks the said hinge to make the head rigid while in use, and by yielding, on an obstruction being encountered, prevents breakage resulting. Springs forming mediums of attachment for the rake furnish an elastic longitudinal support. Suitably-arranged slots and pivots provide for the variations in the position of the reaper-frame. A further provision adapts the depth of the teeth to be varied. The rake turns on pivots to discharge its load, and may be further lifted to a position behind the driver's seat and there held out of use. It is lifted by the driver through a treadle and hand-lever, either or both. The attachment is applicable to different machines, and may be readily applied, and is of least possible compass, light, strong, and of proved practicability. The invention consists in certain constructions, combinations, and arrangements hereinafter specifically claimed.

Figure 1:
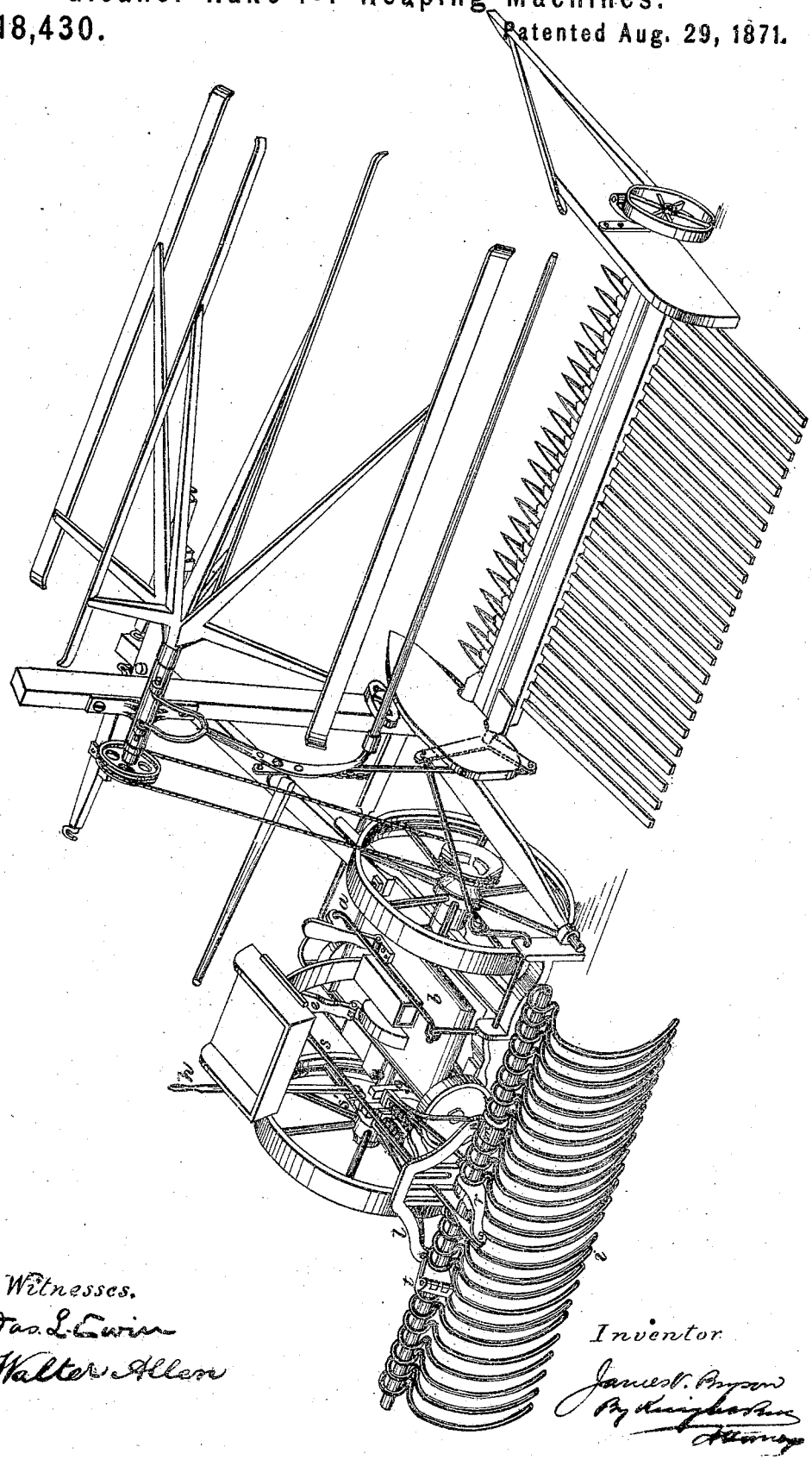
Figure 2:
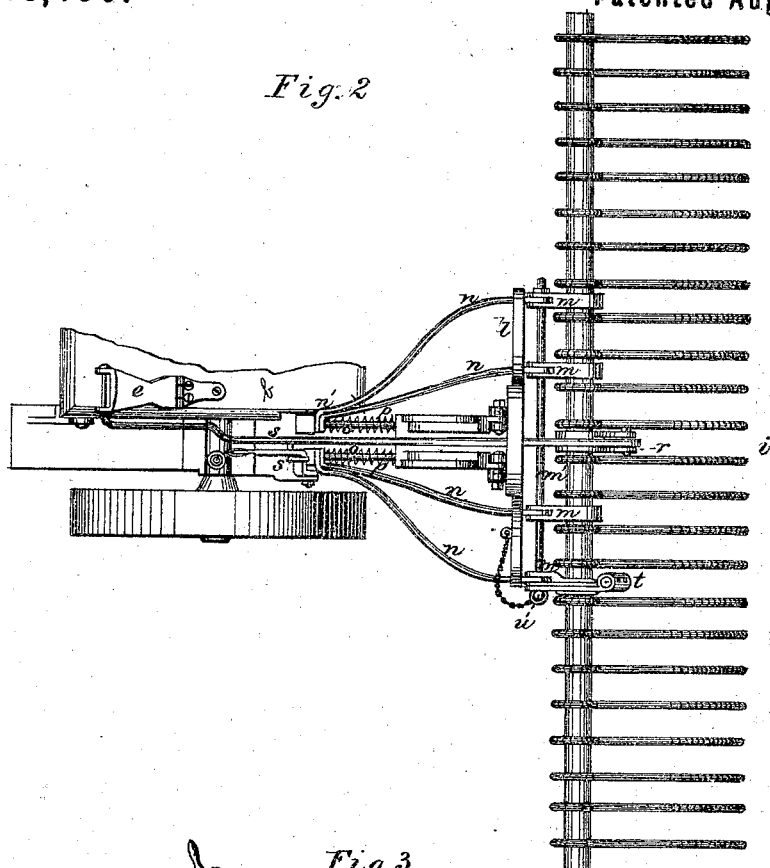
Figure 3:
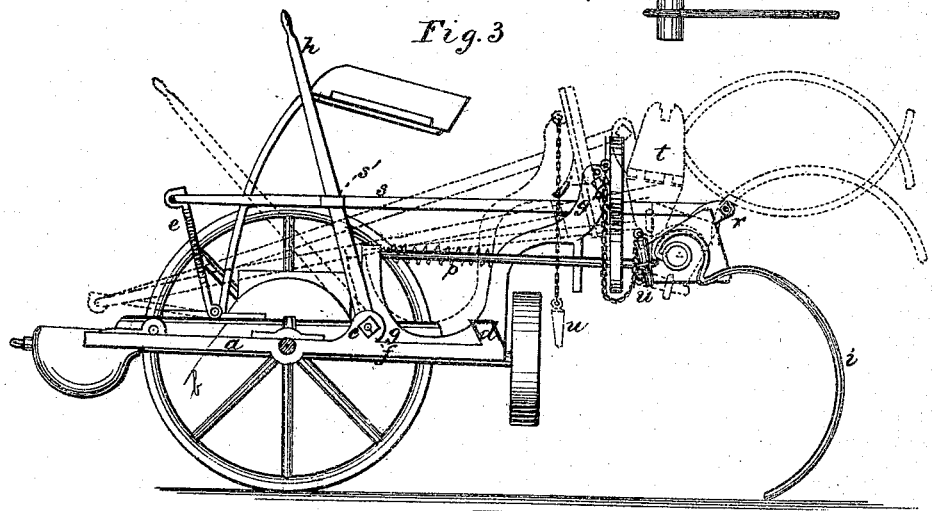
Figure 4:
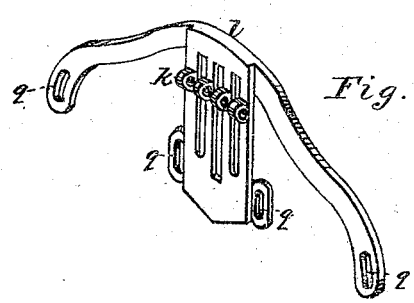

Figure 1 is a perspective view of a reaper provided with my improved gleaner attachment, which is represented in working position. Fig. 2 is a plan view of the attachment and a portion of the reaper-frame to which it is applied, the seat and other parts being omitted. Fig. 3 is an elevation of the same, the near wheel of the reaper being removed, showing in full and dotted lines the position of the parts with the rake at work, discharging, and out of use. Fig. 4 is a perspective of a part hereinafter referred to.

Like reference letters indicate corresponding parts.

$a$ represents the gearing-frame, and $b$ the seat-frame of a reaper. $c$ represents a pair of perforated hinge-lugs, and $d$ a pair of guide-lugs attached to the upper side of the gearing-frame $a$; and $e$, a pivoted treadle attached to the seat-frame $b$ in front of the driver's seat. Attached by a pivot-bolt, $f$, passing through the lugs $c$ and a corresponding socket therein, is the main frame $g$ of the gleaner, and a hand-lever, $h$, to serve, in conjunction with or instead of the treadle $e$, to elevate the rake $i$. The said frame $g$ may be of any form which will adapt it to give support to the several parts hereinafter specified as mounted therein. It is supported laterally at its free end by the said guide-lugs $d$, and while the rake is in use rests between the same. Its front edge presents a pair of vertical flanges, $g'$, perforated to receive transverse pintles $j$, and these, passing through pairs of perforated lugs $k$, Fig. 4, embracing the said flanges, attach a secondary frame, $l$. The rake $i$ is composed of spring-teeth and a head, of gas-pipe, as indicated, or wood, united in any suitable manner. It is pivoted by two pairs of hinges, $m$, having a common pintle, $m'$, to four draw-bars, $n$, united in pairs at their rear ends, and there provided with perforated lugs $n'$, receiving a pair of longitudinal stems, $o$, in the main frame $g$, provided behind the said lugs with springs $p$, through which to apply the draft to the rake. It is supported vertically and laterally by the said secondary frame $l$, the draw-bars $n$ passing through vertical slots $q$ therein. To adjust the rake as to depth, the perforations in the vertical flanges $g'$ are multiplied, as shown in Fig. 3, which adapts the said secondary frame $l$ to be raised or lowered relatively to the main frame $g$. A central crank-arm, $r$, on the rake-head is connected to the treadle $e$ by a rod, $s$, attached to the same by an arm passing through lugs on its under side, and held by a nut. The hand-lever $h$ engages with a hook projection, $s'$, on the side of said rod. The main and secondary frames $g\,l$ are slotted vertically to permit the movement of the rod $s$. The rake-head is divided about in line with the near side of the reaper-frame, and its two parts united by a hinge, $t$. This is combined with one of the hinges $m$, by which the head is attached to the draw-bars, and is so arranged as that its pintle shall be in rear of the head when the rake is in working position. To make the rake-head rigid for work, a wooden pin, $u$, is applied in a staple projecting from one leaf of the hinge through a slot in the other. On an obstruction being encountered the said pin will yield and prevent injury. In addition to this, the hinge permits the projecting part of the rake to be doubled over, as indicated in Fig. 3, to adapt the machine to pass through gates, &c.

It will be seen that by the action of the spring-teeth of the rake $i$ and the springs $p$ and the wooden pin $u$, and the movement permitted by the pivots $f$ and slots $q$, the attachment is adapted to yield at any point to accommodate itself to the surface of the ground and the movements of the reaper, and to pass obstructions with safety. The hinges $m$ adapt the rake to be easily lifted to discharge the grain, and the pivots $f$ and $j$ permit an extended movement, at the end of which the rake-head is behind the driver's seat, where it may be held by a hook, button, or equivalent fastening, engaging, say, with the secondary frame $l$ while the machine is going from place to place. In this position the head will be folded to contract the same. The several positions are clearly indicated in Fig. 3. By removing the pivot $f$ and detaching the connecting-rod $s$ at the treadle, the rake and its appurtenances, including the hand-lever $h$, may be removed. The attaching devices and treadle may be readily applied with the aid of a hand-auger or drill to any reaper. The gleaner will, therefore, constitute a distinct article of manufacture.

I claim as my invention—

1. The rake $i$, constructed with a joint composed of a hinge, $t$, with pintle in rear and a wooden locking-pin, $u$, to adapt it to fold to compact the machine, and to yield so as to pass obstructions.

2. The frame $g$, as represented and described, having a pivot at each end, and affording a support for the intermediate frame $l$ and rake $i$.

3. The secondary frame or vertical support $l$, adjustable vertically on the face of the main frame $g$, as means for varying the depth of the rake.

4. The combination of the hinge-lugs $c$, guide-lugs $d$, pivoted main frame $g$ with stems $o$ and springs $p$, depth-adjusting frame $l$ with slots $q$ and draw-bars $n$, and hinges $m$, as means for attaching a gleaning-rake, the same being constructed and arranged substantially as represented and described.

JAS. V. BRYSON.

Witnesses:
G. V. BIGGS,
J. L. BRYSON.